United States Patent
Vyawahare et al.

(10) Patent No.: US 11,480,508 B2
(45) Date of Patent: Oct. 25, 2022

(54) SYSTEMS AND METHODS FOR DETECTING PARTICLES IN A FLUID CHANNEL

(71) Applicant: Verily Life Sciences LLC, South San Francisco, CA (US)

(72) Inventors: Saurabh Vyawahare, Mountain View, CA (US); Supriyo Sinha, Menlo Park, CA (US); Andrew Homyk, Belmont, CA (US); Michael Gutierrez, San Francisco, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 277 days.

(21) Appl. No.: 16/529,006

(22) Filed: Aug. 1, 2019

(65) Prior Publication Data

US 2020/0041399 A1 Feb. 6, 2020

Related U.S. Application Data

(60) Provisional application No. 62/720,248, filed on Aug. 21, 2018, provisional application No. 62/714,198, filed on Aug. 3, 2018.

(51) Int. Cl.
*G01N 15/02* (2006.01)
*G01N 15/14* (2006.01)
(Continued)

(52) U.S. Cl.
CPC ..... *G01N 15/0211* (2013.01); *G01N 15/1434* (2013.01); *G01N 2015/0065* (2013.01);
(Continued)

(58) Field of Classification Search
CPC ........... G01N 15/0211; G01N 15/1434; G01N 2015/0065; G01N 2015/1075; G01N 2015/1081
See application file for complete search history.

(56) References Cited

U.S. PATENT DOCUMENTS 7,835,013 B2 * 11/2010 Jones .................... G01N 21/45
356/517
8,528,589 B2 * 9/2013 Miller .................... G01N 1/38
137/487.5
(Continued)

FOREIGN PATENT DOCUMENTS

EP 2411148 2/2012
WO 2007051170 5/2007

OTHER PUBLICATIONS

PCT/US2019/044622, "International Search Report and Written Opinion", dated Oct. 31, 2019, 10 pages.

*Primary Examiner* — Michael McCullough
*Assistant Examiner* — Jessica L Burkman
(74) *Attorney, Agent, or Firm* — Kilpatrick Townsend & Stockton LLP

(57) ABSTRACT

Disclosed herein are systems and methods capable of identifying, tracking, and sorting particles or droplets flowing in a channel, for example, a microfluidic channel having a fluid medium. The channel and the fluid medium can have a similar refractive index such that they appear translucent or transparent when illuminated by electromagnetic radiation. The particles or droplets can have a refractive index substantially different from that of the channel and the medium, such that the particles or droplets interfere with the electromagnetic radiation. A sensor can be disposed adjacent to the channel to record the electromagnetic radiation. The sensor can be attached to a system for identifying, tracking, and sorting the droplets.

17 Claims, 5 Drawing Sheets

(51) Int. Cl.
*G01N 15/10* (2006.01)
*G01N 15/00* (2006.01)

(52) U.S. Cl.
CPC .............. *G01N 2015/1075* (2013.01); *G01N 2015/1081* (2013.01)

(56) References Cited

U.S. PATENT DOCUMENTS

| | | |
|---|---|---|
| 10,866,182 B2 * | 12/2020 | Marks ................ G01N 15/1404 |
| 2011/0222051 A1 | 9/2011 | Heng |
| 2013/0323757 A1 * | 12/2013 | Poher ................ G01N 15/1463 |
| | | 435/7.25 |

* cited by examiner

SYSTEMS AND METHODS FOR DETECTING PARTICLES IN A FLUID CHANNEL

CROSS-REFERENCE TO RELATED APPLICATIONS

The present application claims priority to and filing benefit of U.S. Provisional Patent Application No. 62/714,198, filed on Aug. 3, 2018, and U.S. Provisional Patent Application No. 62/720,248, filed on Aug. 21, 2018, which are incorporated herein by reference in their entireties.

BACKGROUND

Biomedical applications requiring identifying, tracking, and sorting of cells, particles, and other droplet-like materials is a rapidly progressing field. Faster and more accurate systems and methods are increasingly desired. It can be desirable to provide systems and methods able to track droplets/particles and to extract the identity, position, and velocity in real time.

SUMMARY

The term embodiment and like terms are intended to refer broadly to all of the subject matter of this disclosure and the claims below. Statements containing these terms should be understood not to limit the subject matter described herein or to limit the meaning or scope of the claims below. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

Embodiments of the present disclosure include a system for detecting at least one particle or at least one droplet in a channel, including a channel having at least one particle or at least one droplet dispersed in a medium, such that the at least one particle or the at least one droplet is moving from a first end of the channel to a second end of the channel, a source of electromagnetic radiation that illuminates at least a portion of the channel, a sensor to detect the at least one particle or the at least one droplet, wherein the sensor is positioned along the linear axis of the illuminated portion of the channel such that the sensor is substantially parallel to the direction of movement of the at least one particle through the channel, and an optical system that focuses and aligns the illuminated portion of the channel to the sensor.

In certain embodiments, the sensor is a linear charge-coupled sensor, a linear complementary metal-oxide-semiconductor sensor, any suitable optical sensor, or any combination thereof. In some non-limiting examples, the channel is positioned in or on a substrate. In some aspects, the source of illumination comprises an optical system. In certain embodiments, the system further includes a plurality of particles or droplets and/or a plurality of channels and/or a plurality of linear sensors. Thus, in some cases, the sensor and a detector detect the movement and or position of the at least one particle or at least one droplet over a predetermined time and/or distance. As described herein, the optical system comprises a lens selected from the group consisting of a cylindrical lens, or a telecentric lens, or a spherical lens, or an aspheric lens, or any suitable lens, or any combination thereof. In some non-limiting examples, the sensor can detect spectral information about the particle or the droplet. Additionally, the system can include a sensor positioned within the region of illumination, but perpendicular to the linear axis. In some cases, the substrate and the medium have a similar refractive index. In some aspects, signals from the sensor are used to modulate a device that is separate from the system (e.g., a component for sorting the plurality of particles in a channel based on the size, position and/or other characteristics). In some embodiments, the device that is separate from the system is a component for sorting a plurality of particles in a channel based on size, position, and/or other characteristics.

Also described herein is a method of detecting at least one particle or at least one droplet in a channel comprising allowing the at least one particle or the at least one droplet to flow through the channel (the channel having a substantially linear axis perpendicular to the circumference of the channel), aligning a linear sensor along the substantially linear axis of the channel, illuminating the channel with electromagnetic radiation along at least the linear axis (wherein the at least one particle or the at least one droplet changes optical properties of the electromagnetic radiation transmitted to the sensor), and detecting, with the linear sensor, the electromagnetic radiation as transmitted along the linear axis of the channel. In some cases, the detecting is performed in real time. In some non-limiting examples, the detecting can include characterizing the at least one particle or the at least one droplet (e.g., identifying the at least one particle or the at least one droplet, recording a velocity of the at least one particle or the at least one droplet, recording a size of the at least one particle or the at least one droplet, recording an absorption spectrum of the at least one particle or the at least one droplet, recording a fluorescent spectrum of the at least one particle or the at least one droplet; recording light scattering of the at least one particle or the at least one droplet, recording a refractive index of the at least one particle or the at least one droplet, any suitable characterization technique, or any combination thereof). In some aspects, the method further includes sorting a plurality of particles or droplets in real time according to particle or droplet identification, particle or droplet size, or any suitable attribute. The sorting can be performed by actuating at least an electrode, valve or other component that may be used to change a direction of particle flow through the channel.

BRIEF DESCRIPTION OF THE DRAWINGS

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

DETAILED DESCRIPTION

I. Overview

Figure 1:
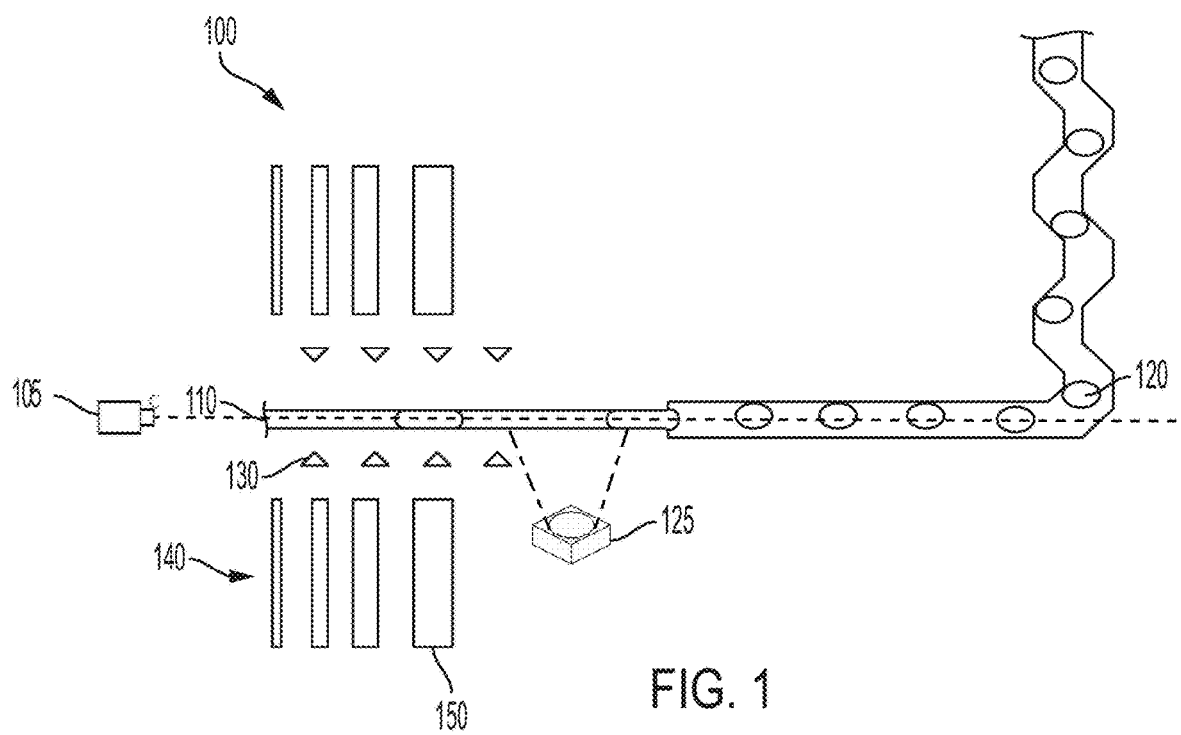
FIG. 1 is an illustration of a micrograph showing droplets flowing in a channel according to an embodiment described herein.

Certain aspects and features of the present disclosure relate to tracking particles or droplets in a channel and in some embodiments, specifically to fluorescence activated cell sorting (FACS). Disclosed herein are systems and methods capable of identifying, tracking, and sorting particles or droplets flowing in a channel. The channel can be a microfluidic channel disposed onto or within a substrate. The channel can further include a medium in which the particles or droplets can be carried (i.e., such that the particles or droplets flow through the channel in the medium). The channel and the medium can have a similar refractive index such that they appear translucent or transparent to each other, and when illuminated by electromagnetic radiation are simultaneously translucent or transparent to the radiation. In certain cases, at least two of the substrate, the channel, and/or the medium are translucent or transparent. In some cases, at least two of the substrate, the channel, and/or the medium can have a similar refractive index such that they are, or appear translucent or transparent to each other. The particles or droplets can have a refractive index substantially different from that of the substrate, the channel, and/or the medium, such that the particles or droplets interfere with the electromagnetic radiation. A sensor can be disposed adjacent to the channel to record the electromagnetic radiation. The sensor can be attached to a system for identifying, tracking, and sorting the particles or droplets. A plurality of channels can be combined to form a network. It is noted that description embodiments described for compositions may also be incorporated in methods and/or systems and vice versa.

II. Definitions

Unless defined otherwise, all technical and scientific terms used herein have the same meaning as is commonly understood by one of ordinary skill in the art to which this disclosure belongs. All patents, applications, published applications and other publications referred to herein are incorporated by reference in their entireties. If a definition set forth in this section is contrary to or otherwise inconsistent with a definition set forth in the patents, applications, published applications and other publications that are herein incorporated by reference, the definition set forth in this section prevails over the definition that is incorporated herein by reference.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements. It is understood that aspects and embodiments of the disclosure described herein include "consisting" and/or "consisting essentially of" aspects and embodiments.

The term "and/or" when used in a list of two or more items, means that any one of the listed items can be employed by itself or in combination with any one or more of the listed items. For example, the expression "A and/or B" is intended to mean either or both of A and B, i.e. A alone, B alone or A and B in combination. The expression "A, B and/or C" is intended to mean A alone, B alone, C alone, A and B in combination, A and C in combination, B and C in combination or A, B, and C in combination.

Various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used herein a translucent material is a material wherein a fraction of impinging light diffracted above 2.5° of an incident angle (referred to as "haze") exceeds 30%. Such techniques are explained fully in the literature (e.g., Arie Ram, "Fundamentals of Polymer Engineering," Springer Science & Business Media (2013)).

As used herein a transparent material is a material wherein greater than 75% of ultraviolet light, visible light and near-infrared radiation (e.g., electromagnetic radiation having a wavelength from about 200 nm to about 2500 nm) can transmit through the transparent material. Such techniques are explained fully in the literature, such as, ASTM Standard D1003.

As used herein, two materials and/or media (or a material and a medium) having equal or similar refractive indices refract light similarly with respect to each other, thus allowing the light to pass through the two materials/media uninhibited, providing a substantially transparent pair. For example, glass and air have similar refractive indices, thus light passes through glass and air uninhibited. Conversely, when two media/materials have significantly different refractive indices, light transmitting from a first media/material to a second media/material is refracted in directions significantly differently as to inhibit light transmission through the system.

As used herein, a droplet is a self-contained volume of a first medium dispersed, suspended, or otherwise included in a second medium. Generally, the first medium of the droplet is a liquid and the second medium is either a liquid or a gas, though it need not be. The droplet may be homogeneous or heterogeneous (i.e., include other materials within the droplet such as solid particles, gas bubbles, miscible liquids, immiscible liquids, or the like). For example, in various non-limiting embodiments the droplet may be an oil droplet in an aqueous medium, a water droplet in an oil medium, a soap bubble in air, or the like).

Other objects, advantages and features of the present disclosure will become apparent from the following specification taken in conjunction with the accompanying drawings.

III. Systems

In some non-limiting examples, disclosed herein is a system for detecting at least one particle or at least one droplet in a channel, including a channel having at least one particle or at least one droplet dispersed in a medium, such that the at least one particle or the at least one droplet (i.e., the particle or the droplet) is moving from a first end of the channel to a second end of the channel, a source of electromagnetic radiation that illuminates at least a portion of the channel, a sensor to detect the particle or the droplet, wherein the sensor is positioned along the linear axis of the illuminated portion of the channel such that the sensor is substantially parallel to the direction of movement of the particle through the channel, and an optical system that focuses and aligns the illuminated portion of the channel to the sensor.

In some non-limiting examples, the channel is positioned in or on a substrate. In some cases, the substrate can be a silicon wafer substrate, a polymer substrate (e.g., a poly (dimethylsiloxane) (PDMS) substrate), a gallium arsenide wafer substrate, a glass substrate, a ceramic substrate (e.g., a yttrium stabilized zirconia (YSZ) substrate), or any suitable substrate. In some non-limiting examples, the channel can be positioned within the substrate. For example, the channel can be created by creating at least a first half of a channel in a first substrate and creating a second half of a channel in a second substrate, and aligning and joining the first substrate to the second substrate such that the first half of the channel and the second half of the channel form a complete channel encased within the first substrate and the second substrate. In some other examples, the channel can be at least partially exposed to the environment outside of the substrate. For example, a portion of the substrate can be removed in a predetermined pattern creating an exposed channel positioned at least partially within the substrate, such that any medium and/or particles or droplets (e.g., cells, liposomes, or the like) are exposed to the environment outside of the substrate when flowing through the channel. The portion of the substrate can be removed by any one of reactive ion etching (i.e., dry etching), wet chemical etching (i.e., wet etching), electron beam (E-beam) lithography, photolithography (e.g., photolithography employing dry etching and/or wet etching), laser etching, any suitable material removal technique, or any combination thereof. In some further examples, the channel can be fabricated on the substrate. For example, the channel can be created by depositing a material onto the substrate, removing at least a portion of the material in a predetermined pattern (e.g., a channel or a network of channels) to create a channel within the material deposited onto the substrate. The portion of the material deposited onto the substrate can be removed by any one of reactive ion etching (i.e., dry etching), wet chemical etching (i.e., wet etching), electron beam (E-beam) lithography, photolithography (e.g., photolithography employing dry etching and/or wet etching), laser etching, soft lithography, two-photon lithography, forming the channel around a sacrificial template, any suitable material removal technique, or any combination thereof. In certain embodiments, the channel can be created by three dimensional (3D) printing.

Also, as noted herein, the channel may be configured in a variety of shapes. The channel can have a square shape, a rectangular shape, a triangular shape, a circular shape, an elliptical shape, or any suitable shape. In further embodiments, for example, the channel can have any two dimensional (2D) cross section and/or three dimensional (3D) shape. Thus, the channel cross section can be a rectangle, square, circle, ellipse, polygon, parallelogram, triangle, any combination thereof, or any suitable shape.

The channels disclosed herein may be configured in a variety of sizes. Round channels can have a diameter of from about 1 nm to about 1 cm (e.g., about 50 nm to about 500 nm, about 0.5 cm to about 1 cm, about 500 nm to about 500 microns (µm), about 50 mm to about 1 cm, or about 1 nm to about 100 nm). For example, round channels can have a diameter of 1 nm, 5 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 µm, 5 µm, 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1 mm, 5 mm, 10 mm, 20 mm, 30 mm, 40 mm, 50 mm, 60 mm, 70 mm, 80 mm, 90 mm, 1 cm, or anywhere in between. Rectangular channels can have a width of from about 1 nm to about 1 cm (e.g., about 50 nm to about 500 nm, about 0.5 cm to about 1 cm, about 500 nm to about 500 microns, about 50 mm to about 1 cm, or about 1 nm to about 100 nm). For example, rectangular channels can have a width of 1 nm, 5 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 µm, 5 µm, 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1 mm, 5 mm, 10 mm, 20 mm, 30 mm, 40 mm, 50 mm, 60 mm, 70 mm, 80 mm, 90 mm, 1 cm, or anywhere in between. Rectangular channels can have a depth of from about 1 nm to about 1 cm (e.g., about 50 nm to about 500 nm, about 0.5 cm to about 1 cm, about 500 nm to about 500 microns, about 50 mm to about 1 cm, or about 1 nm to about 100 nm). For example, rectangular channels can have a depth of 1 nm, 5 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 µm, 5 µm, 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1 mm, 5 mm, 10 mm, 20 mm, 30 mm, 40 mm, 50 mm, 60 mm, 70 mm, 80 mm, 90 mm, 1 cm, or anywhere in between.

The medium can be at least partially contained within a channel, wherein the channel can be fashioned as a plurality of channels, a network of channels, a reservoir, an inlet, an outlet, a source, a drain, or any combination thereof. The channel can be contained within the substrate. The channel or plurality of channels can be disposed on a surface of the substrate such that the medium can be exposed to any environment in which the substrate can be placed.

The channel created in the substrate can have at least a first end and a second end. In some examples, the substrate can have a first port disposed on a surface of the substrate, wherein the first port can be an inlet. The inlet can expose at least part of a channel disposed within the substrate to the exterior of the substrate, enabling filling the channel with a medium (e.g., oil, water, any suitable medium, or any combination thereof) and/or the particles or droplets. The inlet can optionally be sealed after filling the channel with the medium and/or the particles or droplets. Sealing the inlet can include gluing, pinching, clamping, recasting (e.g., melting the inlet material and allowing the material to solidify in a sealed state), or plugging. Optionally, the substrate can have a second port disposed on a surface of the substrate, wherein the second port can be an outlet. The outlet can expose at least part of a channel disposed within the substrate to the exterior of the substrate, enabling draining the channel of the medium and/or the particles or droplets. The outlet can optionally be opened after filling the channel with the medium and/or the particles or droplets to drain the channel. Opening the outlet can include dissolving glue, unpinching, unclamping, melting, piercing, or unplugging.

In some cases, the substrate and the medium have a similar refractive index. In certain embodiments, the substrate and the channel have a similar refractive index. For example, the substrate can have a refractive index that is similar to a gas filling the channel (e.g., air, an inert gas, a processing gas, or any combination thereof). In some examples, the medium and the channel have a similar refractive index (e.g., when the channel is partially filled with the medium, the medium and the gas filling a remainder of the channel can have a similar refractive index). In some cases all, or at least two of the substrate, the medium, and/or the channel all have a similar refractive index and/or are translucent and/or transparent. For example, when the substrate, the medium, and the channel have a similar refractive index, the system can be substantially translucent and/or substantially transparent. In some cases, the refractive indices of the substrate, the channel, and the medium can be within about up to 5% of each other. For example, the refractive indices of the substrate and the medium can be within about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2%, 3.1%, 3%, 2.9%, 2.8%, 2.7%, 2.6%, 2.5%, 2.4%, 2.3%, 2.2%, 2.1%, 2%, 1.9%, 1.8%, 1.7%, 1.6%, 1.5%, 1.4%, 1.3%, 1.2%, 1.1%, 1%, 0.9%, 0.8%, 0.7%, 0.6%, 0.5%, 0.4%, 0.3%, 0.2%, 0.1%, 0% (e.g., matching refractive indices), or anywhere in between.

In some embodiments, a plurality of channels can be formed in a substrate to create a network of channels. The channels can intersect in 2D and/or in 3D. For example, the channels can intersect at any suitable angle (e.g., about 1° to about 359°, or anywhere in between) in a single plane. In some further examples, the channels can intersect across a plurality of planes (i.e., the channels can be formed into interplanar interconnects). In a still further example, the channels can intersect within a single plane and across a plurality of planes. In still further examples, the channel can have a 3D shape. For example, the channel can be a coil, a toroid, an arc, or a helix. For example, the sensor can be placed along and/or within a linear axis of a coil or a toroid. In certain embodiments, the channel is a microfluidic channel.

In certain embodiments, the sensor is a linear charge-coupled sensor, or a linear complementary metal-oxide-semiconductor sensor, though it need not be. In certain other embodiments, the sensor may be a capacitive sensor, an optical sensor, a resistive sensor, an inductive sensor, a time of flight sensor, a camera (e.g., a high-speed camera), any suitable sensor, or any combination thereof. In some aspects, the sensor can be placed adjacent to the microfluidic channel. For example, the sensor can be suspended above the microfluidic channel (e.g., when the microfluidic channel is placed partially within the substrate or onto the substrate), the sensor can be placed beneath the substrate (e.g., the substrate can be placed onto the sensor. In some non-limiting examples, the sensor can detect spectral information about the particle or droplet. For example, the sensor can be coupled to a fluorescence spectrometer, an absorption spectrometer, an optical spectrometer, any suitable spectrophotometer, or any combination thereof (e.g., when employed in a fluorescence activated cell sorting (FACS) system). In some aspects, the illumination source can provide excitation energy. For example, when the particle or droplet is a fluorescent particle or droplet, the illumination source can provide EM radiation sufficient to excite the fluorescent particle or droplet such that the fluorescent particle or droplet fluoresces. Thus, the sensor can characterize the fluorescence of the particle or droplet. In some non-limiting examples, spectral information of the particle or droplet can be employed to identify the particle or droplet. In certain other embodiments, the sensor can be configured to detect partial spectral information about the particle or droplet. For example, a filter can be placed in front of the sensor to allow only a desired wavelength of electromagnetic radiation to the sensor. In further embodiments, the excitation energy can be tuned to excite at least a portion of the particle or droplet. For example, the particle or droplet can contain several different species (e.g., small molecule pendant groups attached to a main backbone, several different dye species, several different ligands, or the like) wherein a first subset of particles or droplets can be sorted from a second subset of particles or droplets.

In certain embodiments, a line sensor can be employed to detect the particle or the droplet crossing a point or a channel cross-section by positioning the line sensor so that the array is perpendicular to the linear axis of the channel. Additionally, a perpendicular sensor can be used to determine a position of the particle or the droplet within the channel.

In some aspects, the source of illumination comprises an optical system. The optical system can comprise any suitable arrangement of optical components such that a predetermined amount and kind of electromagnetic radiation is employed. For example, the optical system can include an electromagnetic (EM) radiation source (e.g., a visible light source, an ultraviolet light source, an infrared light (IR) source, any suitable EM radiation source, or any combination thereof), a lens (e.g., a spherical lens, an aspherical lens, an axisymmetric lens, a non-axisymmetric lens, a cylindrical lens, a telecentric lens, an anamorphic lens, a collimating lens, any suitable lens, or any combination thereof), a mirror (e.g., a full silvered mirror, a half silvered mirror, any suitable mirror, or any combination thereof), a prism, a waveguide, optical fiber, any suitable optical component, or any combination thereof. In certain embodiments, a variety of different lenses can be employed in the optical system to improve performance. For example, a cylindrical lens can expand or contract an image of the channel along an axis (e.g., the linear axis of the channel), a very fast cylindrical lens can be used to account for any residual tilt in the axis that might be greater than the height of a pixel, and/or a telecentric lens (e.g., a lens that preserves distances at different focal points) can be used to prevent errors in length measurements.

In some cases, the particle or the droplet is a cell, a liposome, a bead, an emulsion, a colloid, a cell fragment, a cell cluster, a vesicle, an extracellular vesicle, an exosome, a virus, a quantum dot, a nanoparticle, a surface-enhanced Raman spectroscopy (SERS) particle, any suitable material dispersed in a medium, or any combination thereof. In certain embodiments, the particle or the droplet can have a diameter of from about 1 µm to about 1 mm (e.g., about 10 µm to about 100 µm). For example, the particle or the droplet can have a diameter of about 1 µm, about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, about 200 µm, about 210 µm, about 220 µm, about 230 µm, about 240 µm, about 250 µm, about 260 µm, about 270 µm, about 280 µm, about 290 µm, about 300 µm, about 310 µm, about 320 µm, about 330 µm, about 340 µm, about 350 µm, about 360 µm, about 370 µm, about 380 µm, about 390 µm, about 400 µm, about 410 µm, about 420 µm, about 430 µm, about 440 µm, about 450 µm, about 460 µm, about 470 µm, about 480 µm, about 490 µm, about 500 µm, about 510 µm, about 520 µm, about 530 µm, about 540 µm, about 550 µm, about 560 µm, about 570 µm, about 580 µm, about 590 µm, about 600 µm, about 610 µm, about 620 µm, about 630 µm, about 640 µm, about 650 µm, about 660 µm, about 670 µm, about 680 µm, about 690 µm, about 700 µm, about 710 µm, about 720 µm, about 730 µm, about 740 µm, about 750 µm, about 760 µm, about 770 µm, about 780 µm, about 790 µm, about 800 µm, about 810 µm, about 820 µm, about 830 µm, about 840 µm, about 850 µm, about 860 µm, about 870 µm, about 880 µm, about 890 µm, about 900 µm, about 910 µm, about 920 µm, about 930 µm, about 940 µm, about 950 µm, about 960 µm, about 970 µm, about 980 µm, about 990 µm, about 1 mm, or anywhere in between.

In some aspects, the particle or the droplet can move through the channel at a rate of from about 0.01 meters per second (m/s) to about 10 m/s. For example, the particle or droplet can move at a rate of about 0.01 m/s, about 0.05 m/s, about 0.1 m/s, about 0.5 m/s, about 1 m/s, about 1.5 m/s, about 2 m/s, about 2.5 m/s, about 3 m/s, about 3.5 m/s, about 4 m/s, about 4.5 m/s, about 5 m/s, about 5.5 m/s, about 6 m/s, about 6.5 m/s, about 7 m/s, about 7.5 m/s, about 8 m/s, about 8.5 m/s, about 9 m/s, about 9.5 m/s, about 10 m/s, or anywhere in between.

In certain embodiments, a plurality of particles or droplets can be detected by the system. In some cases, the plurality of particles or droplets can be produced at a rate of from about 1 per second to about 10,000 per second (/s). For example, the particles or droplets can be produced at a rate of about 1/s, about 5/s, about 10/s, about 50/s, about 100/s, about 500/s, about 1000/s, about 1500/s, about 2000/s, about 2500/s, about 3000/s, about 3500/s, about 4000/s, about 4500/s, about 5000/s, about 5500/s, about 6000/s, about 6500/s, about 7000/s, about 7500/s, about 8000/s, about 8500/s, about 9000/s, about 9500/s, about 10,000/s, or anywhere in between.

In some aspects, signals from the sensor are used to modulate a device that is separate from the system (e.g., a component for sorting the plurality of particles in a channel based on the size, position and/or other characteristics). In some non-limiting examples, the device that is separate from the system is an electrode, a valve (e.g., an electronic valve, a pneumatic valve, a hydraulic valve, any suitable valve, or any combination thereof), a switch, a magnet, any suitable particle directing device, or any combination thereof. In some cases, the device that is separate from the system is an analytical tool (e.g., a spectrophotometer), a display (e.g., for reporting data, or for providing analysis by a lab-on-a-chip device), a pressure modulator (e.g., for maintaining or controlling pressure in a closed-loop system), any suitable device, or any combination thereof.

In certain embodiments, the system further includes a plurality of particles or droplets, and/or a plurality of channels, and/or a plurality of sensors. In some embodiments, a plurality of substrates can be combined to form a network system. Any suitable system design can be accomplished by combining the plurality of substrates.

IV. Methods

Described herein is a method of detecting at least one particle or at least one droplet in a channel comprising allowing the at least one particle or the at least one droplet (i.e., the particle or the droplet) to flow through the channel (the channel having a substantially linear axis perpendicular to the circumference of the channel), aligning a linear sensor along the substantially linear axis of the channel, illuminating the channel with electromagnetic radiation along at least the linear axis (wherein at least the particle or the droplet changes optical properties of the electromagnetic radiation transmitted to the sensor), and detecting, with the linear sensor, the electromagnetic radiation as transmitted along the linear axis of the channel.

In certain embodiments, allowing the particle or the droplet to flow through the channel can be a laboratory method (e.g., analyzing blood or conducting research), a lab-on-a-chip method (e.g., analyzing fluids in an emergency), any suitable method wherein a plurality of particles or droplets are suspended in a medium and require analysis, or any combination thereof.

In some cases, the detecting is performed in real time (e.g., detecting the particle or the droplet can be instantaneous such that a desired action can be taken in response to the identification of the particle or the droplet). Aligning a single line sensor (i.e., a sensor that has a line of pixels that takes a line scan along the linear axis of the channel and uses, in some examples, contrast changes to determine the location of the particle or the droplet along the channel) can provide a constant stream of information about the channel and the particle or the droplet in the channel. In certain embodiments, the sensor is aligned with the linear axis of the channel at a fixed location above the channel, thus allowing the particle or the droplet to flow past the sensor. Illuminating the channel from a side opposite the sensor can allow the sensor to detect light transmitting through the channel and the medium in which the particle or the droplet is suspended. In some aspects, the sensor is aligned with the linear axis of the channel such that, in the line of pixels, a first pixel in the line of pixels is positioned over a first area being observed by the sensor, and each subsequent pixel is positioned over a subsequent area being observed. Thus, allowing the particle or the droplet to flow past the sensor further allows the particle or the droplet to interfere with the light transmitting through the channel and the medium, further allowing detection of the particle or the droplet.

In some non-limiting examples, all, or at least two of the substrate, the channel, and/or the medium have similar refractive indices such that neither the substrate, the channel, nor the medium interfere with the light transmitting through with respect to each other. In some non-limiting examples, all, or at least two of, the substrate, the channel, and the medium are translucent or transparent. Accordingly, the particle or the droplet can have a different refractive index, or, in some examples, be opaque, and interfere with the light transmitting through the system, allowing the sensor to detect the particle or the droplet.

In certain embodiments, illuminating the channel is performed with bright-field illumination (e.g., white light) and the sensor is an optical sensor. Due to the difference in refractive index between the substrate, the channel, and the medium (e.g., oil) (i.e., the system), and a dispersed droplet (e.g., water), the boundary of the droplet stands out as circle of dark pixels as shown in FIG. 1.

FIG. 1 shows a system 100 placed on a substrate bearing a microfluidic channel 110. The microfluidic channel 110 was filled with oil. Water droplets 120 were dispersed in the oil and forced to flow through the microfluidic channel 110. Alignment marks 130 were employed to ensure proper positioning of the sensor. A linear sensor 105 is aligned with a linear axis of the microfluidic channel 110. Scale bars 140 were employed to verify sizing the particles. For example, the largest scale bar 150 is 100 μm wide. An illumination source 125 is positioned such that light can be transmitted through the microfluidic channel 110.

Figure 2:
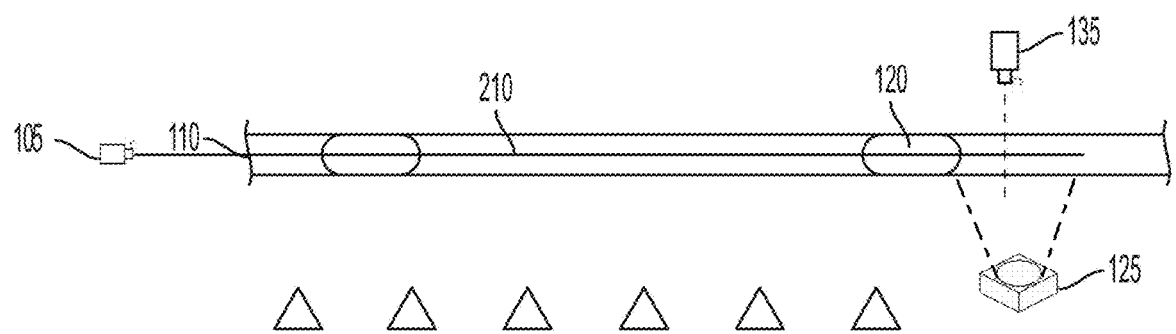
FIG. 2 is an illustration of a micrograph showing droplets flowing in a channel according to an embodiment described herein.

FIG. 2 shows a system for performing a method as described herein. In some non-limiting examples, a linear sensor 105 can be aligned with a linear axis 210 of the channel 110. An illumination source 125 can be positioned such that light can be transmitted through the substrate and channel 110. In some cases, the droplet 120 can have a different refractive index than the substrate, and/or the medium, and/or the channel. In some aspects, the droplet 120 can be opaque. In some further cases, the droplet 120 can have a similar refractive index to the substrate, the medium and/or the channel, however, the edges of the droplet 120 can still effectively interfere with the light, allowing for detection of the droplet 120 flowing through the channel 110. A second sensor 135 positioned within the illuminated portion of the channel 110, but perpendicular to the linear axis.

In certain embodiments, when the sensor is a single line sensor (e.g., a sensor that employs an array of pixels arranged in a line), a line scan can be taken along the linear axis 210 of the channel 110. Thus, contrast changes can be recorded to determine the location of the droplet 120, a particle, a liposome, or any suitable material dispersed in a medium flowing within the channel 110.

Figure 3:
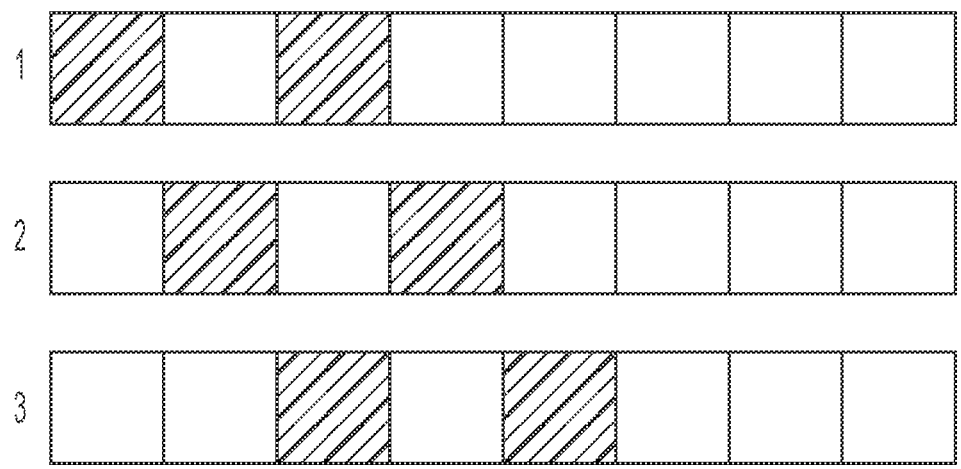
FIG. 3 is a schematic depicting a droplet flowing past a sensor according to an embodiment described herein.

FIG. 3 is a schematic depicting the progression of the droplet 120 along the linear axis 210 of the channel 110 and the sensor. In certain embodiments, row 1 (top row in FIG. 3) depicts a first time or line scan, row 2 (center row in FIG. 3) depicts a second time or line scan, and row 3 (bottom row in FIG. 3) depicts a third time or line scan. Darkened pixel depictions illustrate the boundary of the droplet 120 interfering with light transmitting through the system. In the example of FIG. 3, row 1 illustrates the boundary of the droplet 120 blocking light from the first and third pixels and light is allowed to transmit to the second pixel (e.g., the center of the droplet 120), as well as the fourth through eighth pixels (e.g., no droplet 120 is present). In the second time (see row 2), as the droplet 120 progresses, light transmitting through the system is blocked from the second and fourth pixels of the sensor by the boundary of the droplet 120. Accordingly, in the third time (see row 3), light transmitting through the system is blocked from the third and fifth pixels as in the example of FIG. 3. Thus, size, velocity, and/or acceleration of the droplet 120 can be provided from information detected by the sensor.

In certain embodiments, velocity can be provided by evaluating multiple contiguous line scans, for example, at least two line scans. Accordingly, dividing a distance traveled by the droplet 120 (i.e., a position recorded by a first line scan subtracted from a position recorded by a second line scan) by the time between the two scans can provide a velocity. In a further example, employing at least a third line scan can provide an acceleration of the droplet 120 when needed or desired.

Figure 4:
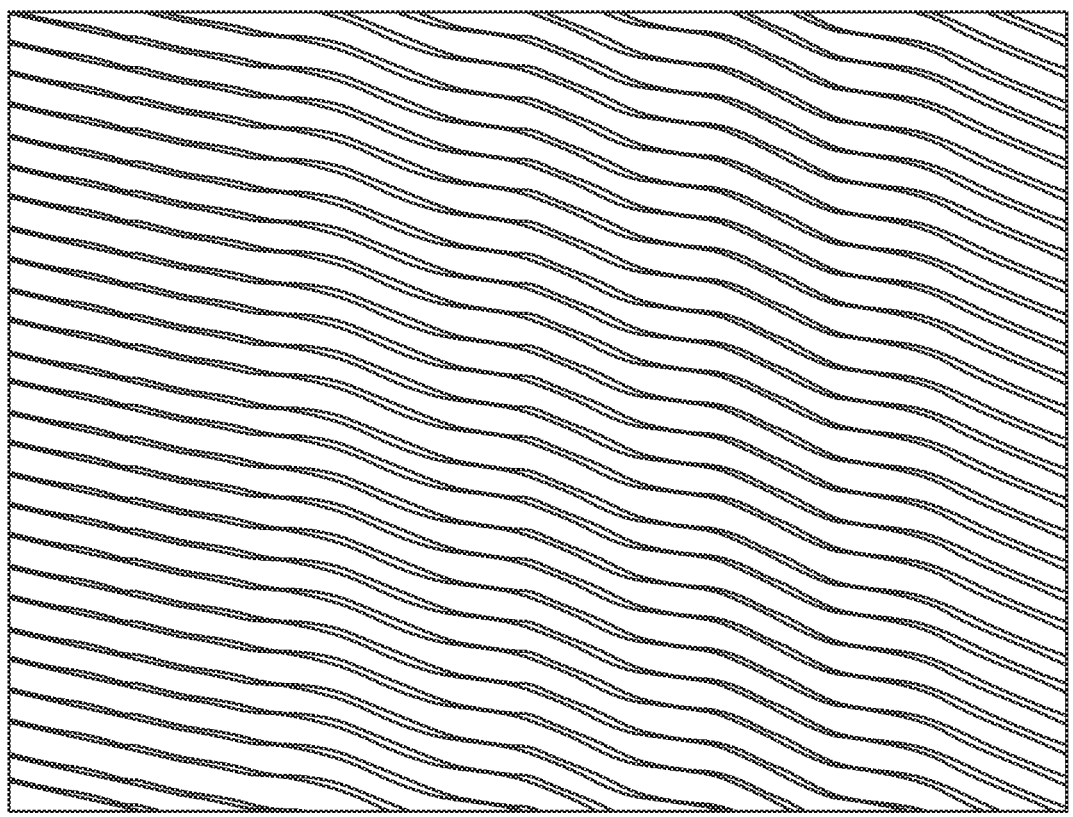
FIG. 4 is an illustration of a kymograph produced according to an embodiment described herein.

In some cases, data recorded from the sensor can be presented as a kymograph (see FIG. 4). In the example of FIG. 4, the y-axis represents time and the x-axis represents position of the droplet 120. The kymograph represents the progression of the droplet 120 as recorded by the sensor in the example of FIG. 3. The progression of the droplet 120 is depicted as a single line, thus the kymograph in the example of FIG. 4 depicts the progression of 35 droplets. Velocity of the droplet 120 is represented by the slope of the line (e.g., a steeper slope indicates a slower droplet). In the example of FIG. 4, velocity of the droplet 120 was varied as it progressed through the channel 110.

In some aspects, a plurality of particles or droplets can be detected simultaneously. In certain embodiments, the sensor can perform the line scans constantly, providing constant real time analysis of the particles or droplets flowing in the channel. In some examples, the sensor can perform greater than 1000 line scans per second (e.g., greater than 1100 line scans per second, greater than 1200 line scans per second, greater than 1300 line scans per second, greater than 1400 line scans per second, greater than 1500 line scans per second, greater than 1600 line scans per second, greater than 1700 line scans per second, greater than 1800 line scans per second, greater than 1900 line scans per second, greater than 2000 line scans per second, or anywhere in between). Thus, the line scan data can be used to identify and/or track the particles or droplets and a signal can be sent to device external to the system to perform a desired action (e.g., characterizing, sorting, or any suitable action).

In certain embodiments, the desired action can be characterizing the particle or droplet, sorting the particle or droplet, modifying the particle or droplet, treating the particle or droplet, any suitable action, or any combination thereof. In some examples, sorting the particle or droplet can be performed by activating an external device, including an electrode, a valve, any flow control mechanism, or any combination thereof. In certain embodiments, modifying the particle or droplet can include releasing a chemical into the channel, emitting radiation to the particle or droplet, or the like.

In some non-limiting examples, characterizing the particle can include identifying the particle or droplet, recording a velocity of the particle or droplet, recording an acceleration of the particle or droplet, recording a size of the particle or droplet, or any combination thereof). Characterizing the particle can be performed employing any suitable characterization systems or methods able to use information captured by the sensor. For example, illuminating the channel with electromagnetic radiation can include transmitting a wavelength of light that can excite an aspect of the droplet or particle and stimulate fluorescence. The fluorescence can be recorded by a spectrophotometer coupled to the sensor and the particle or droplet can be identified by its fluorescent spectrum.

In some aspects, the method further includes sorting a plurality of particles or droplets in real time according to particle or droplet identification, particle or droplet size, or any suitable attribute. In certain embodiments, the plurality of particles or droplets can include various different particles or droplets requiring sorting for analytical, research, or any suitable purpose.

The sorting can be performed by actuating at least an electrode, valve or other component that may be used to modulate flow through the channel. In some aspects, the sorting can be performed based on information detected by the sensor. In certain embodiments, actuating an electrode can produce an electric field within and/or across the channel capable of redirecting the particle or droplet flowing in the channel into a secondary channel or reservoir (e.g., as in a network system including a plurality of channels or the like).

In certain embodiments, the system described herein can react to the velocity of the particles or droplets. For example, the system can be employed to actuate a pressure control mechanism to control the velocity of the particles or droplets and/or the pressure of the system (e.g., in a closed-loop system having a predetermined pressure constraint).

In some embodiments, a plurality of channels can be formed in a substrate to create a network of channels. The channels can intersect in 2D and/or in 3D. For example, the channels can intersect at any suitable angle (e.g., about 1° to about 359°, or anywhere in between) in a single plane. In some further examples, the channels can intersect across a plurality of planes (i.e., the channels can be formed into interplanar interconnects within a substrate, or between a plurality of substrates). In a still further example, the channels can intersect within a single plane and across a plurality of planes. In still further examples, the channel can have a 3D shape. For example, the channel can be a coil, a toroid, an arc, or a helix.

The method of producing the channel, creating an inlet or an outlet, creating channels and otherwise preparing a substrate for implementation of channels can further include the use of at least one of photolithography, wet etching, reactive ion etching, soft lithography, two-photon lithography, 3D printing, or forming the channel around a sacrificial template.

V. Examples

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

Figure 5:
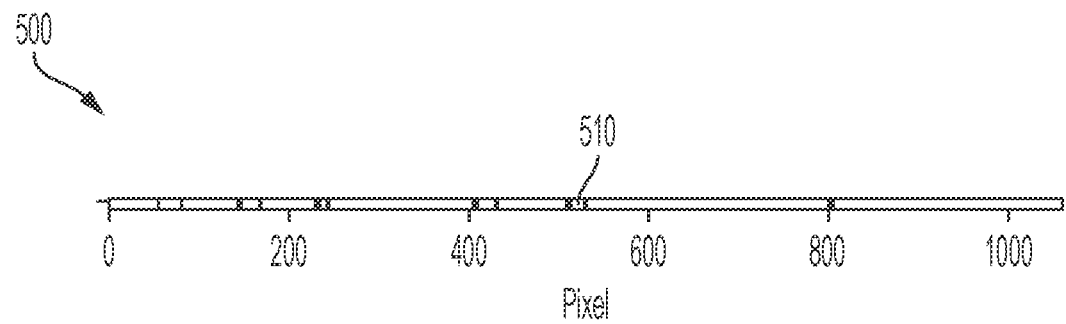
FIG. 5 is an illustration of a digital image showing droplets flowing in a channel according to an embodiment described herein.
Figure 6:
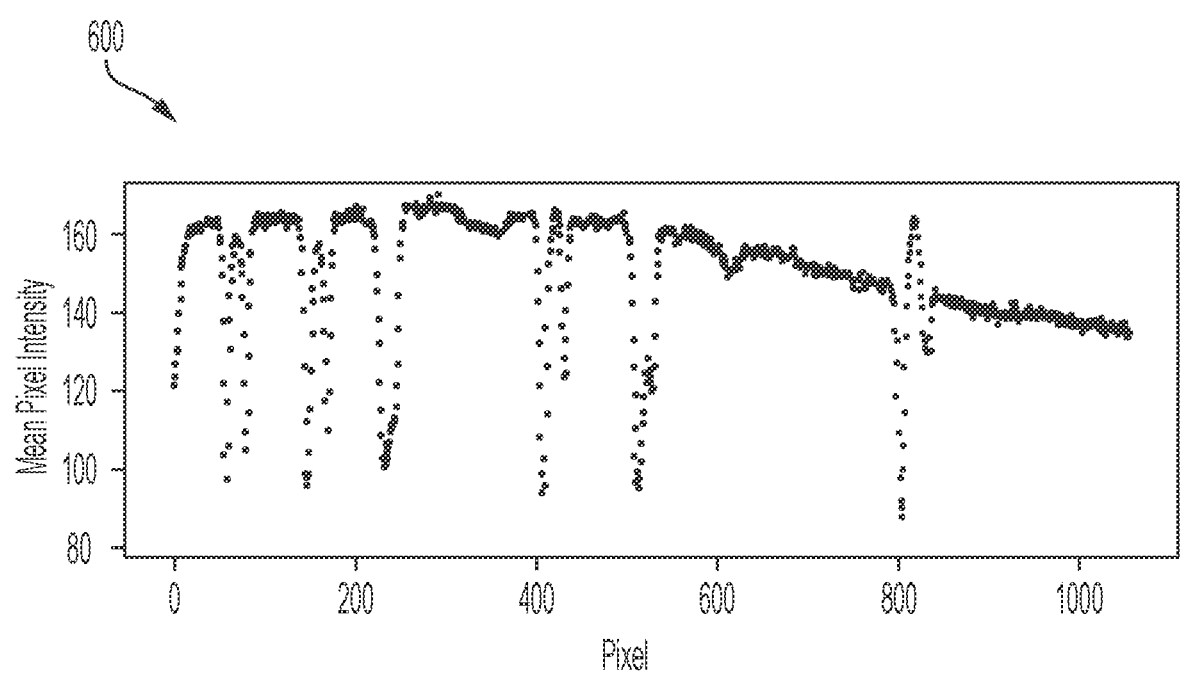
FIG. 6 is a graph showing data detected by a sensor adjacent to a channel according to an embodiment described herein.

FIG. 5 is an illustration of a line scan 500 having a scan width of one pixel (depicted as image height in the example of FIG. 5) and a scan length of about 1000 pixels (depicted as image width in the example of FIG. 5). Droplets 510 have a dark boundary and a lighter interior in bright-field illumination (e.g., white light) that makes the droplets 510 detectable to the sensor. In the example of FIG. 5, a single-pixel wide area of a full frame camera image was extracted from the full frame image for analysis. Accordingly, higher frame rates (e.g., greater than about 1000 frames per second (fps)) and real time processing was possible. The system included a beam splitter to send some light to a pointgrey camera (e.g., a camera that performed line scans) as well as a high-speed camera (e.g., a fast camera that performed full frame imaging). The images were processed and data 600 was provided (see FIG. 6). FIG. 6 is a graph showing light intensity (referred to as "Mean Pixel Intensity") as a function of position (indicated by Pixel number across the image provided in the example of FIG. 5). Areas of higher light intensity indicated either no droplets 510 present or the center of the droplets 510 was observed. Decreased light intensity indicated the edges of the droplets 510, as shown as darker areas in the example of FIG. 5.

Figure 7:
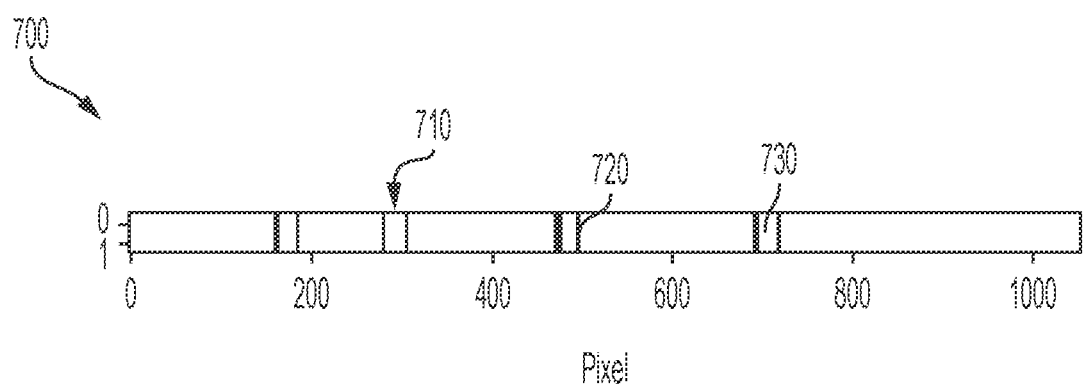
FIG. 7 is an illustration of a digital image showing droplets flowing in a channel according to an embodiment described herein.
Figure 8:
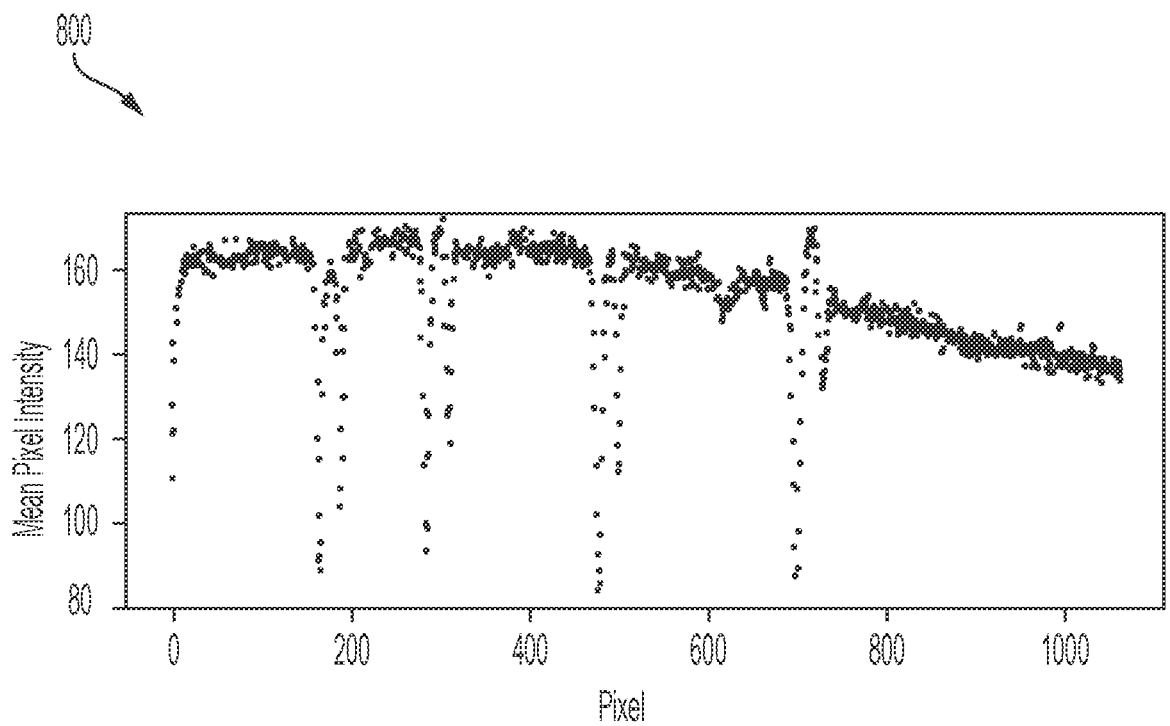
FIG. 8 is a graph showing data detected by a sensor adjacent to a channel according to an embodiment described herein.

FIG. 7 is an illustration of a line scan 700 having a scan width of two pixels (depicted as image height in the example of FIG. 7) and a scan length of about 1000 pixels (depicted as image width in the example of FIG. 7). Droplets 710 have a dark boundary 720 and a lighter interior 730 in bright-field illumination (e.g., white light) that makes the droplets 710 detectable to the sensor. In the example of FIG. 7, a two pixel wide area of a full frame camera image was extracted from the full frame image for analysis as described above. The images were processed and data 800 was provided (see FIG. 8). FIG. 8 is a graph showing light intensity (referred to as "Mean Pixel Intensity") as a function of position (indicated by Pixel number across the image provided in the example of FIG. 7). Areas of higher light intensity indicated either no droplets 710 present or the center of the droplets 710 was observed. Decreased light intensity indicated the dark boundary 720 of the droplets 710, as shown as darker areas in the example of FIG. 7.

Figure 9A:
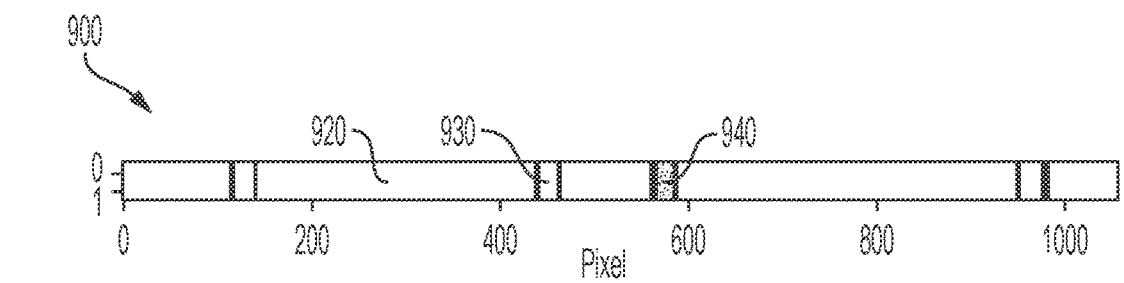
FIG. 9A is an illustration of a digital image showing droplets flowing in a channel and an accompanying graph showing data detected by a sensor adjacent to the channel according to an embodiment described herein.
Figure 9A:
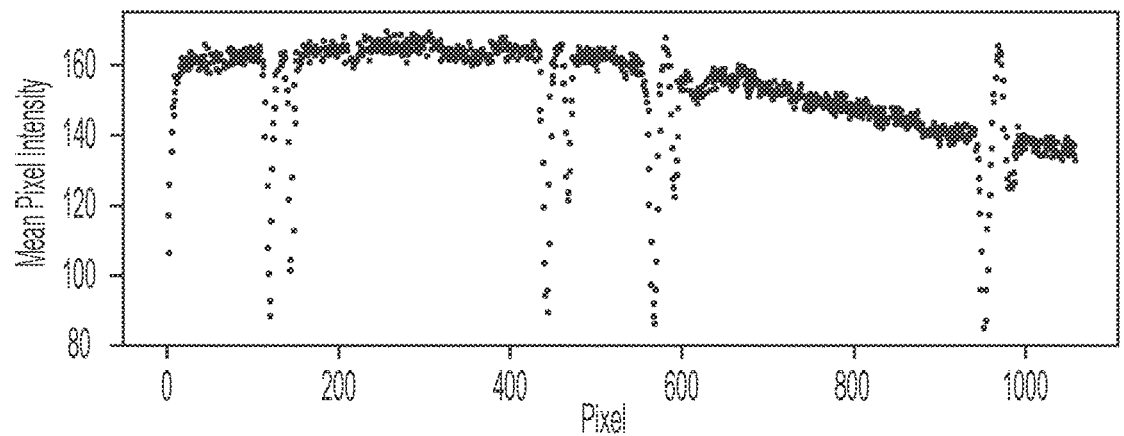
Figure 9B:
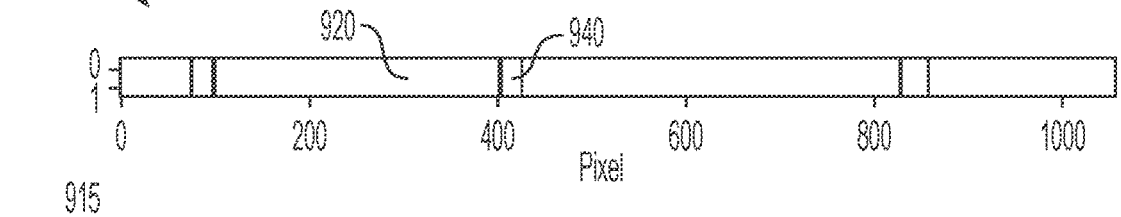
FIG. 9B is an illustration of a digital image showing droplets flowing in a channel and an accompanying graph showing data detected by a sensor adjacent to the channel according to an embodiment described herein.
Figure 9B:
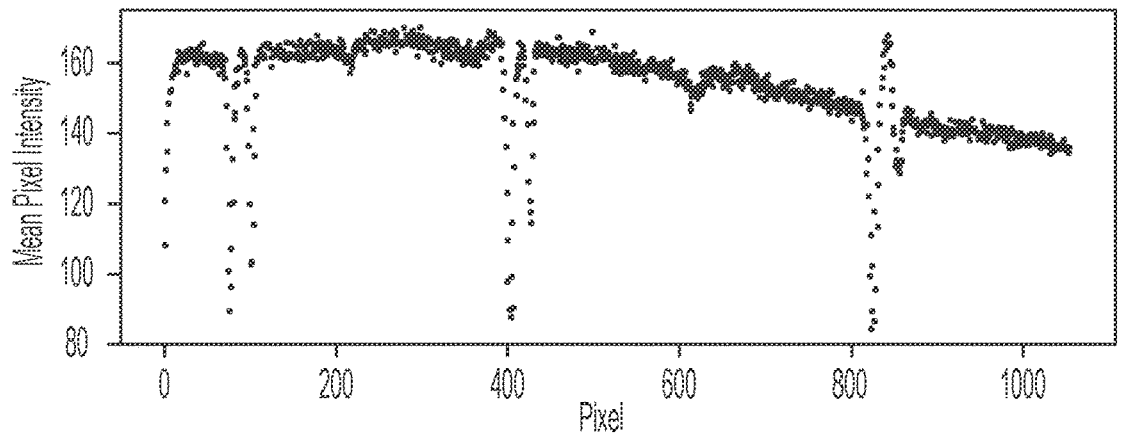

FIGS. 9A and 9B are illustrations of a first line scan 900 and its accompanying first light intensity graph 910, and a second consecutive line scan 905 and its accompanying second light intensity graph 915. In the example of FIGS. 9A and 9B, sorting was performed by analyzing the light intensity signal (e.g., recorded brightness) obtained from the first line scan 900 and the second line scan 905. Each pixel of both line scans 900, 905 was aligned to a predetermined position along the channel. In the example of FIGS. 9A and 9B, the pixel intensity was calculated as an average pixel intensity since the line consisted of more than one pixel in width (e.g., a 2 pixel width line scan as in the example of FIG. 7). Droplets moving along a main channel 920 show up in both light intensity graphs 910, 915 as a decrease in light intensity relative to the brightness of adjacent pixels, as in the examples of FIGS. 6 and 8. In the example of FIGS. 9A and 9B, a side channel was attached to the main channel 920 at a position between pixel 400 and pixel 600. Additionally, an electrode was positioned next to the side channel. When actuated by the light intensity signal, a voltage was applied to the electrode, forcing a droplet into the side channel. Actuating the electrode was based on dielectrophoresis. In the example of FIGS. 9A and 9B, a non-uniform electric field of the electrode was combined with the difference between the dielectric constant of the medium and the dielectric constant of a droplet 930. The electric field interaction (i.e., dielectrophoretic effect) caused a force on the droplet 930, forcing it into the side channel. A reference droplet 940 was following the droplet 930. The reference droplet 940 is seen in the first line scan 900 and the second line scan 905, wherein the droplet 930 is seen in the first line scan 900 and was sorted into the side channel and is not visible in the second line scan 905. The droplet 930 was forced into the side channel because its dielectric constant triggered the dielectrophoretic effect, placing the electric field of the droplet 930 into the working range of the electrode. If no voltage was applied (i.e., no dielectrophoretic effect occurred), the channel configuration ensured that a droplet not intended to be sorted (e.g., the reference droplet 940) was not forced into the side channel, but maintained flow along the main channel 920. When a droplet was observed at a position just before the side channel, a decision was made in real time by a program whether or not a voltage was applied to deflect the droplet or not. Sorting was further verified by confirming that there was no decrease in the light intensity signal in the second light intensity graph 915.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

Illustrations of Suitable Systems and Methods

Illustration 1 is a system for detecting a particle in a channel, comprising: a channel comprising at least one particle dispersed in a medium, such that the at least one particle is moving from a first end of the channel to a second end of the channel; a source of electromagnetic radiation that illuminates at least a portion of the channel; a sensor to detect the at least one particle, wherein the sensor is positioned along a linear axis of the illuminated portion of the channel such that the sensor is substantially parallel to a direction of movement of the at least one particle through the channel; and an optical system that focuses and aligns the illuminated portion of the channel to the sensor.

Illustration 2 is the system of any preceding or subsequent illustration, wherein the sensor comprises a linear charge-coupled sensor, a linear complementary metal-oxide-semiconductor sensor, any suitable optical sensor, or any combination thereof.

Illustration 3 is the system of any preceding or subsequent illustration, wherein the channel is positioned in or on a substrate.

Illustration 4 is the system of any preceding or subsequent illustration, wherein a source of electromagnetic radiation comprises an optical system.

Illustration 5 is the system of any preceding or subsequent illustration, comprising a plurality of particles and/or a plurality of channels and/or a plurality of linear sensors.

Illustration 6 is the system of any preceding or subsequent illustration, further comprising a detector coupled to the sensor, wherein the detector detects movement and/or position of the at least one particle over a predetermined time and/or distance.

Illustration 7 is the system of any preceding or subsequent illustration, wherein the optical system comprises a lens selected from the group consisting of a cylindrical lens, or a telecentric lens, or a spherical lens, or an aspheric lens, or any suitable lens, or any combination thereof.

Illustration 8 is the system of any preceding or subsequent illustration, wherein the sensor detects spectral information about the particle.

Illustration 9 is the system of any preceding or subsequent illustration, wherein the particle is a droplet.

Illustration 10 is the system of any preceding or subsequent illustration, further comprising a sensor positioned within the illuminated portion of the channel, but perpendicular to the linear axis.

Illustration 11 is the system of any preceding or subsequent illustration, wherein the at least two of the substrate, the channel and the medium have a similar refractive index.

Illustration 12 is the system of any preceding or subsequent illustration, wherein signals from the sensor are used to activate a device that is separate from the system.

Illustration 13 is the system of any preceding or subsequent illustration, wherein the device that is separate from the system is a component for sorting a plurality of particles in a channel based on size, position and/or other characteristics.

Illustration 14 is a method of detecting at least one particle in a channel using the system of any preceding illustration, comprising: allowing the at least one particle to flow through the channel, the channel having a substantially linear axis perpendicular to a circumference of the channel; aligning a linear sensor along the substantially linear axis of the channel; illuminating the channel with electromagnetic radiation along at least the linear axis, wherein the at least one particle changes optical properties of the electromagnetic radiation transmitted to the linear sensor; and detecting, with the line sensor, the electromagnetic radiation as transmitted along the substantially linear axis of the channel.

Illustration 15 is the method of any preceding or subsequent illustration, wherein the detecting is in real time.

Illustration 16 is the method of any preceding or subsequent illustration, further comprising characterizing the at least one particle.

Illustration 17 is the method of any preceding or subsequent illustration, wherein characterizing the at least one particle comprises identifying the at least one particle, recording a velocity of the at least one particle, recording a size of the at least one particle, recording an absorption spectrum of the at least one particle, recording a fluorescent spectrum of the at least one particle; recording light scattering of the at least one particle, recording a refractive index of the at least one particle, any suitable characterization technique, or any combination thereof.

Illustration 18 is the method of any preceding or subsequent illustration, further comprising sorting a plurality of particles in real time.

Illustration 19 is the method of any preceding or subsequent illustration, wherein the sorting is performed according to particle identification, particle size, any suitable attribute, or any combination thereof.

Illustration 20 is the method of any preceding or subsequent illustration, wherein the sorting is performed by actuating at least an electrode, valve or other component that may be used to change a direction of particle flow through the channel.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A system for detecting a particle in a channel, comprising:
    a substrate;
    a channel positioned in or on the substrate, the channel comprising at least one particle dispersed in a medium, such that the at least one particle is moving from a first end of the channel to a second end of the channel;
    a source of electromagnetic radiation that illuminates at least a portion of the channel;
    a first sensor to detect the at least one particle, wherein the first sensor is positioned in line with a linear axis of the illuminated portion of the channel such that the first sensor is parallel to a direction of movement of the at least one particle through the channel;
    a second sensor positioned within the illuminated portion of the channel, wherein the second sensor is perpendicular to the linear axis of the channel; and
    an optical system that focuses and aligns the illuminated portion of the channel to the first sensor;

wherein the substrate, the channel, and the medium have a similar refractive index.

2. The system of claim 1, wherein the first sensor and the second sensor comprises a linear charge-coupled sensor, a linear complementary metal-oxide-semiconductor sensor, or any combination thereof.

3. The system of claim 1, wherein the source of electromagnetic radiation comprises another optical system.

4. The system of claim 1, comprising a plurality of particles and/or a plurality of channels and/or a plurality of linear sensors.

5. The system of claim 1, further comprising a detector coupled to the first sensor, wherein the detector detects movement and/or position of the at least one particle over a predetermined time and/or distance.

6. The system of claim 1, wherein the optical system comprises a lens selected from the group consisting of a cylindrical lens, or a telecentric lens, or a spherical lens, or an aspheric lens, or any combination thereof.

7. The system of claim 1, wherein the first sensor detects spectral information about the particle.

8. The system of claim 1, wherein the at least one particle is a droplet.

9. The system of claim 1, wherein signals from the first sensor are used to activate a device.

10. The system of claim 9, wherein the device is a component for sorting a plurality of particles in a channel based on size, position and/or other characteristics.

11. A method of detecting a particle in a channel comprising:

providing a substrate comprising a channel;

allowing at least one particle to flow through the channel, the channel having a linear axis perpendicular to a circumference of the channel;

aligning a linear sensor in-line with the linear axis of the channel such that the linear sensor is parallel to a direction of movement of the at least one particle through the channel;

illuminating the channel with electromagnetic radiation along at least the linear axis, wherein the at least one particle changes optical properties of the electromagnetic radiation transmitted to the linear sensor;

aligning a second sensor perpendicular to the linear axis of the channel such that the second sensor is perpendicular to a direction of movement of the at least one particle through the channel; and detecting, with the linear sensor, the electromagnetic radiation as transmitted along the linear axis of the channel, wherein the substrate, the channel, and the medium have a similar refractive index.

12. The method of claim 11, wherein the detecting is in real time.

13. The method of claim 11, further comprising characterizing the at least one particle.

14. The method of claim 13, wherein characterizing the at least one particle comprises identifying the at least one particle, recording a velocity of the at least one particle, recording a size of the at least one particle, recording an absorption spectrum of the at least one particle, recording a fluorescent spectrum of the at least one particle; recording light scattering of the at least one particle, recording a refractive index of the at least one particle, or any combination thereof.

15. The method of claim 13, further comprising sorting a plurality of particles in real time.

16. The method of claim 15, wherein the sorting is performed according to particle identification, particle size, or any combination thereof.

17. The method of claim 15, wherein the sorting is performed by actuating at least an electrode, valve or other component that may be used to change a direction of particle flow through the channel.

* * * * *